US009199798B2

(12) United States Patent
Mizuno

(10) Patent No.: US 9,199,798 B2
(45) Date of Patent: Dec. 1, 2015

(54) DRIVE APPARATUS

(71) Applicant: KYOCERA Document Solutions Inc., Osaka (JP)

(72) Inventor: Masahiko Mizuno, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/493,698

(22) Filed: Sep. 23, 2014

(65) Prior Publication Data

US 2015/0096868 A1    Apr. 9, 2015

(30) Foreign Application Priority Data

Oct. 4, 2013   (JP) ................. 2013-209502

(51) Int. Cl.
*G03G 21/16* (2006.01)
*B65G 33/34* (2006.01)
*G03G 21/10* (2006.01)
*F16H 1/06* (2006.01)

(52) U.S. Cl.
CPC *B65G 33/34* (2013.01); *F16H 1/06* (2013.01); *G03G 21/105* (2013.01); *G03G 21/1647* (2013.01); *G03G 2221/1657* (2013.01)

(58) Field of Classification Search
CPC ........................................... B65G 33/34
USPC ............................................. 198/674
See application file for complete search history.

(56) References Cited

U.S. PATENT DOCUMENTS

| 4,099,427 | A  | * | 7/1978 | Fickelscher | .............. | 475/176 |
| 4,285,159 | A  | * | 8/1981 | Bass et al. | .............. | 446/410 |
| 7,761,039 | B2 | * | 7/2010 | Nishimura et al. | ......... | 399/262 |
| 2008/0170887 | A1 | | 7/2008 | Nishimura et al. | | |

FOREIGN PATENT DOCUMENTS

| JP | 10-003239 | 1/1998 |
| JP | 2003-162192 | 6/2003 |

* cited by examiner

*Primary Examiner* — Gene Crawford
*Assistant Examiner* — Thomas Randazzo
(74) *Attorney, Agent, or Firm* — Wenderoth, Lind & Ponack, L.L.P.

(57) ABSTRACT

The first gear is fixed to a conveyance screw. The second gear is arranged in tandem with the first gear. The third gear meshes with the first gear and the second gear. The first support member supports the first gear to enable movement in one radial direction. The second support member supports the second gear to disable movement in the radial direction. The number of teeth of the first gear and that of the second gear are different. In the first gear, a first cam unit is formed. In the second gear, a second cam unit is formed. The both cam units converts a circumferential relative displacement, generated along with rotation of the third gear, between the first and second gears is converted into a displacement in the one direction of the first gear, in a predetermined period in accordance with the number of rotations of the third gear.

4 Claims, 19 Drawing Sheets

Fig. 13

DRIVE APPARATUS

CROSS-REFERENCE TO RELATED APPLICATION(S)

This application is based upon and claims the benefit of priority from Japanese Patent Application No. 2013-209502 filed on Oct. 4, 2013, the entire contents of which are incorporated herein by reference.

BACKGROUND

The technology of the present disclosure relates to a drive apparatus that drives an axial conveyance screw arranged within a case.

Conventionally, there is known an electrophotographic image forming apparatus that uses a conveyance screw as a means of conveying a development toner, for example.

As this type of image forming apparatus, there is a proposed technology for removing a remaining toner adhering to the surface of a photoconductor drum by using a cleaning device and conveying the removed remaining toner to a toner collection case by using a conveyance screw. The conveyance screw is arranged within a pipe-like case which links between the cleaning device and the toner collection case.

Further, there is also a proposed technology for conveying a toner in a toner replenishment case to a toner discharge port by using a conveyance screw arranged at a lower part of the case. The toner discharged from the toner discharge port is supplied to a development unit.

The above-described conveyance screw is driven via a gear mechanism by a motor, for example. The gear mechanism has, for example, a drive gear linked to a motor and a driven gear that is fixed to one end of the conveyance screw and meshes with the drive gear.

SUMMARY

A drive apparatus according to one aspect of the present disclosure is a drive apparatus that drives an axial conveyance screw arranged within a case. The drive apparatus is provided with a first gear, a second gear, a third gear, a first support member, and a second support member. The first gear is fixed to the conveyance screw. The second gear is arranged in tandem with the first gear in an axial-center direction of the conveyance screw. The third gear meshes with the first gear and the second gear to impart a drive power to the both gears. The first support member supports the first gear to enable movement in one radial direction. The second support member supports the second gear to disable movement in a radial direction. The number of teeth of the first gear is different from the number of teeth of the second gear, and a side surface at the second gear side in the first gear is formed with a first cam unit that protrudes toward the second gear side. A side surface at the first gear side in the second gear is formed with a second cam unit that protrudes toward the first gear side. Then, when the first cam unit and the second cam unit work together, a circumferential relative displacement, generated along with rotation of the third gear, between the first gear and the second gear is configured to be converted into a displacement in the one direction of the first gear, in a predetermined period in accordance with the number of rotations of the third gear.

BRIEF DESCRIPTION OF THE DRAWINGS

FIG. 12A shows an initial state, and FIG. 12B shows states where advance angles (phase in a clockwise direction in the figures) of the second gear 42 relative to the first gear 41 is π/2(rad), and FIG. 12C shows states where advance angle (phase in a clockwise direction in the figures) of the second gear 42 relative to the first gear 41 is π(rad), and FIG. 12D shows states where advance angles (phase in a clockwise direction in the figures) of the second gear 42 relative to the first gear 41 is 3π/2(rad).

FIG. 13 is a table showing a change in phase of a tooth of a second gear generated along with rotation of a third gear and a change in abutting position between a first cam unit b and a second cam unit, with cases where the numbers of rotations of the third gear are 0 rotation (initial state), four rotations, and eight rotations.

DETAILED DESCRIPTION

<<Embodiment>>

Figure 1:
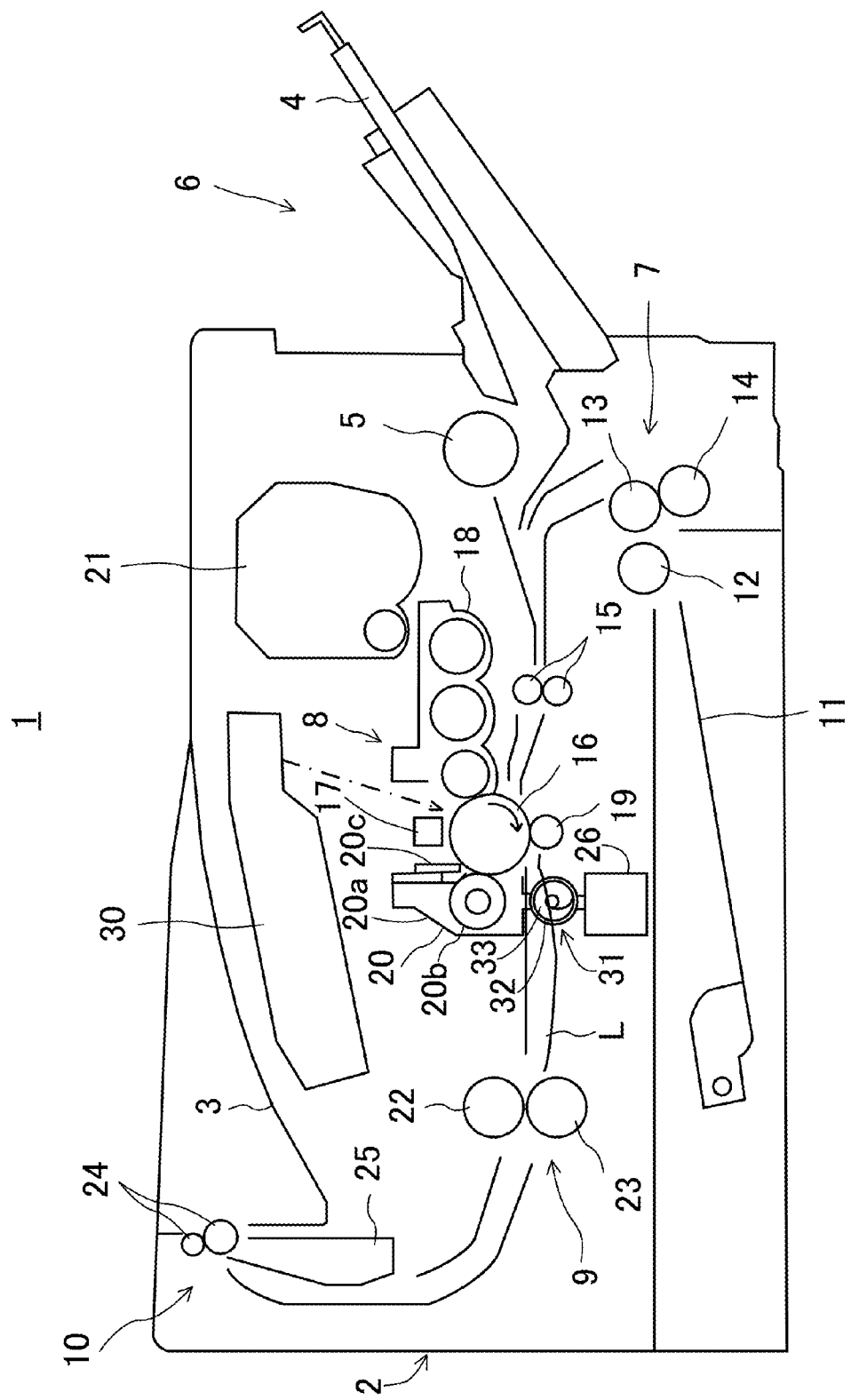
FIG. 1 is a schematic vertical cross-sectional view showing a laser printer provided with a toner conveying device having a drive apparatus in an embodiment.

FIG. 1 is a cross-sectional view showing a schematic configuration of a laser printer 1 as an image forming apparatus in the present embodiment.

A laser printer 1 is provided with a box-like printer body 2, a manual paper feed unit 6, a cassette paper feed unit 7, an image forming unit 8, a fixing unit 9, and a paper discharge unit 10, as shown in FIG. 1. In this way, the laser printer 1 is configured to convey a paper along a conveying path L within the printer body 2 so as to form an image on the paper on the basis of image data transmitted from a terminal not shown or the like.

The manual paper feed unit 6 includes a manual insertion tray 4, which can be opened and closed, arranged in one side part of the printer body 2, and a paper feed roller 5, for manual feed, rotatably arranged inside the printer body 2.

The cassette paper feed unit 7 is arranged at the bottom of the printer body 2. The cassette paper feed unit 7 includes a paper feeding cassette 11 that houses a plurality of papers placed on top of one another, a pick roller 12 that takes out each paper housed in the paper feeding cassette 11, and a feed roller 13 and a retard roller 14 with which the taken-out papers are separated paper by paper and fed to the conveying path L.

The image forming unit 8 is arranged above the cassette paper feed unit 7 within the printer body 2. The image forming unit 8 is provided with a photosensitive drum 16, as an image carrier, arranged rotatably within the printer body 2, a charger 17 disposed around the photosensitive drum 16, a developing unit 18, a transfer roller 19, a cleaning unit 20, a laser scanning unit (LSU) 30, which is an optical scanner, disposed above the photosensitive drum 16, and a toner hopper 21. Thus, the image forming unit 8 is configured to form an image on the paper supplied from the manual paper feed unit 6 or the cassette paper feed unit 7.

It is noted that the conveying path L has a pair of resist rollers 15 that temporarily keeps the fed paper waiting and then supplies the paper to the image forming unit 8 at a predetermined timing.

The fixing unit 9 is arranged at one side of the image forming unit 8. The fixing unit 9 is provided with a fixing roller 22 and a pressing roller 23 which are pressed against each other and rotated. Thus, the fixing unit 9 is configured to fix a toner image, which is transferred to the paper by the image forming unit 8, to the paper.

The paper discharge unit 10 is arranged above the fixing unit 9. The paper discharge unit 10 is provided with a paper discharge tray 3, a pair of paper discharge rollers 24 used for conveying the paper to the paper discharge tray 3, and a plurality of conveyance guide ribs 25 that guide the paper to the paper discharge rollers 24. The paper discharge tray 3 is formed to be recessed at an upper portion of the printer body 2.

If the laser printer 1 receives image data, then the photosensitive drum 16 is rotationally driven in the image forming unit 8 and the surface of the photosensitive drum 16 is electrically charged by the charger 17.

Then, on the basis of the image data, laser light is emitted from the laser scanning unit 30 toward the photosensitive drum 16. An electrostatic latent image is formed on the surface of the photosensitive drum 16 by the irradiation of the laser light. The electrostatic latent image formed on the photosensitive drum 16 is developed by the developing unit 18 into a visible image as a toner image.

Thereafter, the paper is pressed against the surface of the photosensitive drum 16 by the transfer roller 19. Thus, the toner image of the photosensitive drum 16 is transferred to the paper. The paper to which the toner image is transferred is heated and pressed by the fixing roller 22 and the pressing roller 23 in the fixing unit 9. As a result, the toner image is fixed to the paper.

After the toner image is transferred from the photosensitive drum 16 to the paper, the remaining toner adhering to the surface of the photosensitive drum 16 is removed by the cleaning unit 20. The cleaning unit 20 is provided with a cleaning case 20a, a friction roller 20b disposed within the cleaning case 20a, and a cleaning blade 20c. Then, the remaining toner adhering to the surface of the photosensitive drum 16 is dropped by the friction roller 20b and the cleaning blade 20c into the cleaning case 20a. The remaining toner dropped in this way to within the cleaning case 20a is conveyed by the toner conveying device 31 to a toner collection container 26.

The toner conveying device 31 includes a conveyance case 32 that links the cleaning case 20a and the toner collection container 26, an axial conveyance screw 33 disposed within the conveyance case 32, and a drive apparatus 40 (see FIG. 2) used for driving the conveyance screw 33.

Figure 2:
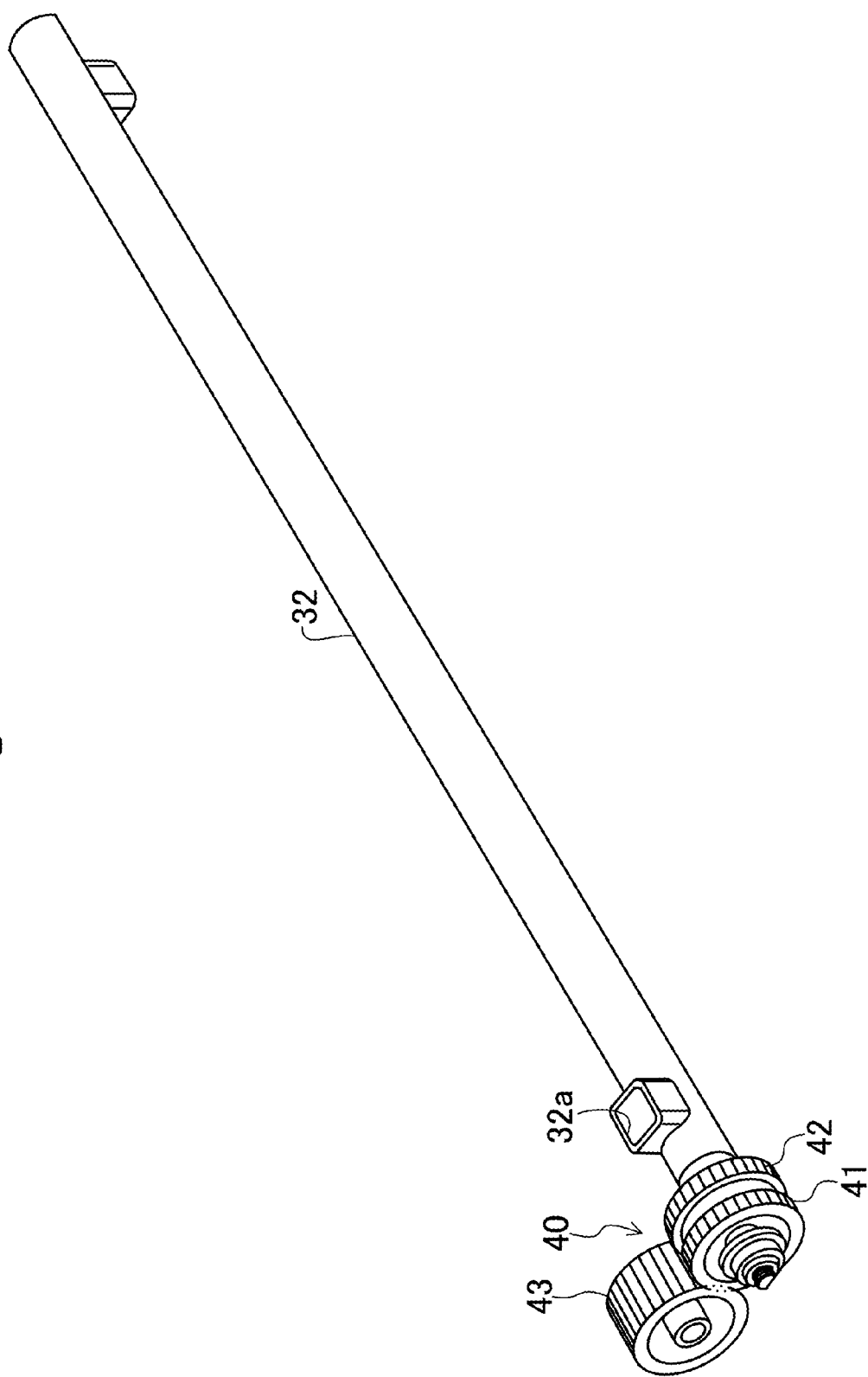
FIG. 2 is a perspective view showing a toner conveying device.
Figure 3:
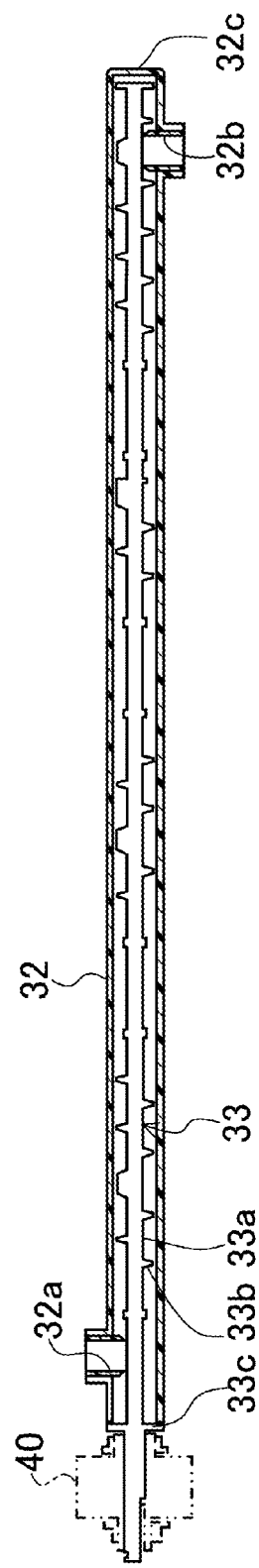
FIG. 3 is a cross-sectional view along the axial center of a toner conveying device.

As shown in FIG. 2 and FIG. 3, the conveyance case 32 is formed to be a pipe-like form (hollow cylindrical shape). One end of the conveyance case 32 is formed with a toner receiving port 32a that opens toward above and receives the toner dropped from the cleaning case 20a. The other end of the conveyance case 32 is formed with a toner discharge port 32b which opens toward below and from which the toner is discharged to the toner collection container 26. The one end of the conveyance case 32 opens, and the conveyance screw 33 is inserted from one end side of the conveyance case 32 into the case 32. On the other hand, the other end side of the conveyance case 32 is closed by a lateral wall 32c.

The conveyance screw 33 includes an axial unit 33a, a spiral blade unit 33b formed along an outer circumferential surface of the axial unit 33a, and a flange unit 33c formed closer to one end of the axial unit 33a. When the conveyance screw 33 rotates, the toner is conveyed from one end side in the axial-center direction of the conveyance screw 33 toward the other end side. One end side of the axial unit 33a (upstream side in a toner conveyance direction) is protruded toward outside the conveyance case 32, and the protruded portion is linked to the drive apparatus 40 for driving the conveyance screw 33. The flange unit 33c functions as a regulation unit that regulates the position in an axial direction of the conveyance screw 33 by abutting one end surface within the conveyance case 32, and functions also as a lid portion that closes the one end side of the conveyance case 32.

Figure 4:
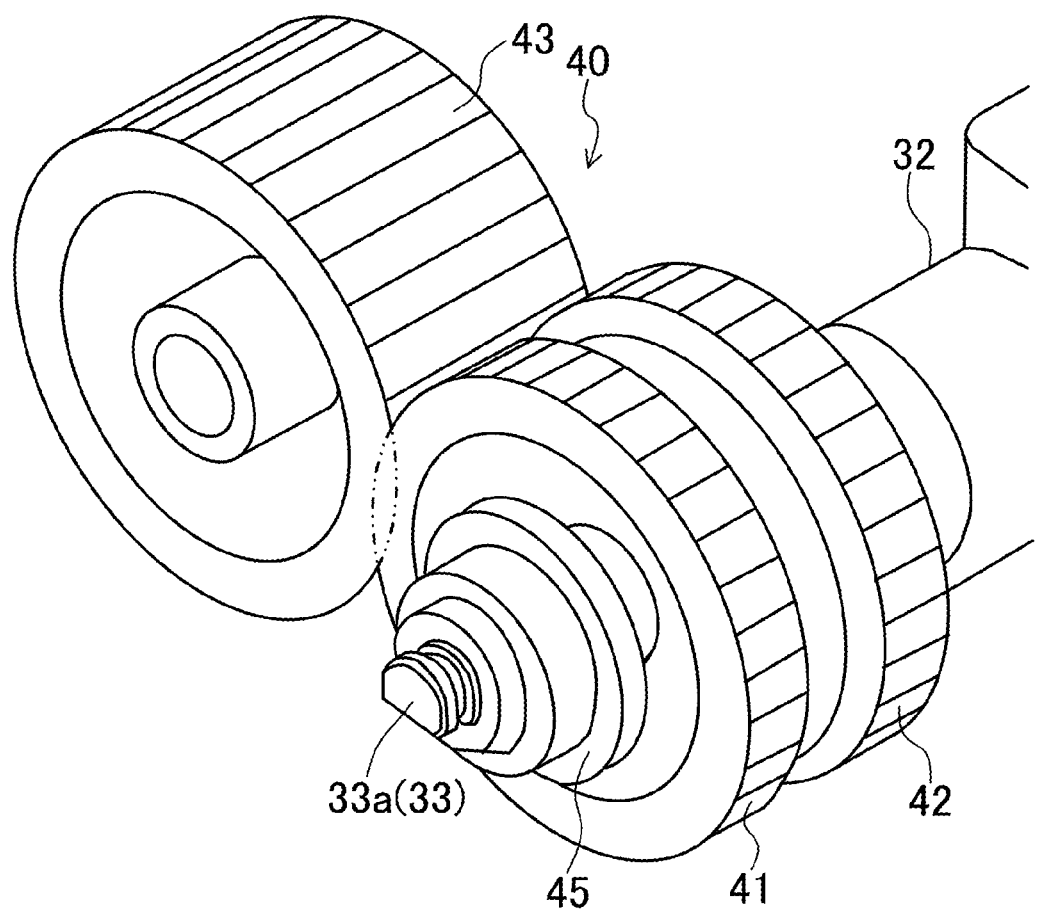
FIG. 4 is an enlarged perspective view showing a drive apparatus in an embodiment.
Figure 5:
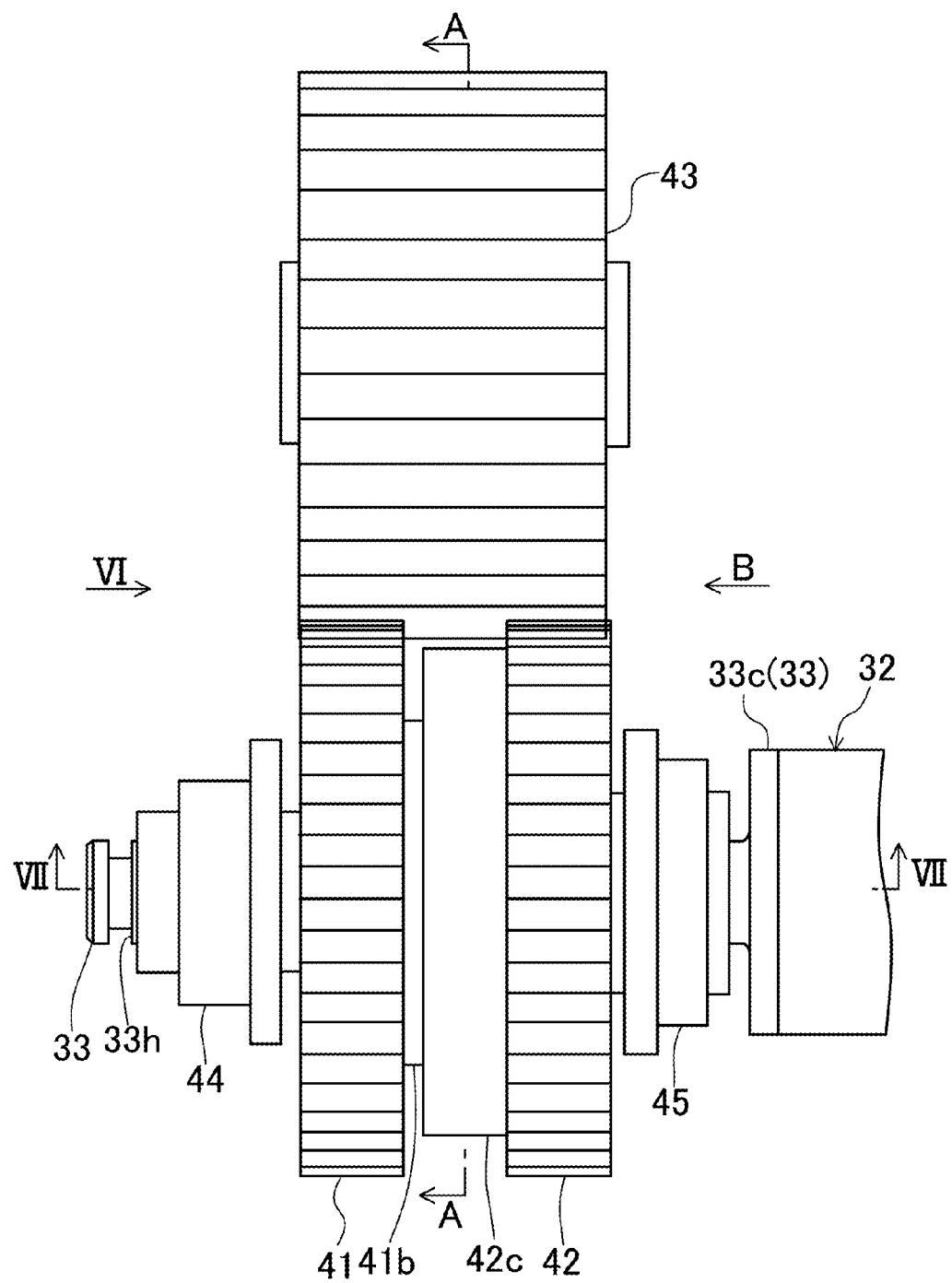
FIG. 5 is a plain view, seen from above, which shows a drive apparatus in an embodiment.
Figure 6:
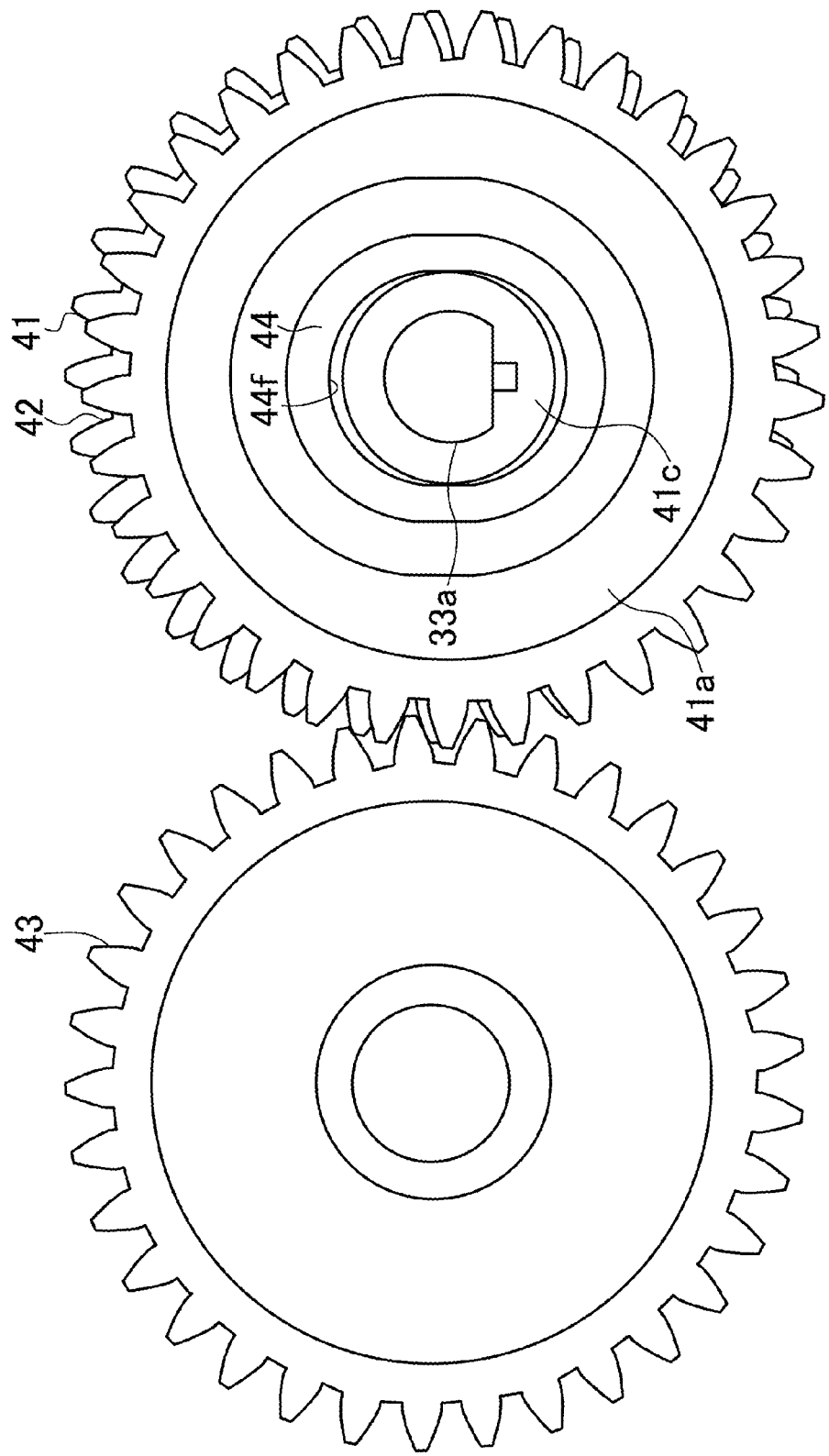
FIG. 6 is an arrow view in a direction of VI of FIG. 5.

As shown in FIG. 4 to FIG. 6, the drive apparatus 40 includes a first gear 41 fixed to the conveyance screw 33 so as to rotate together with the conveyance screw 33, a second gear 42 arranged in tandem with the first gear 41 in an axial-center direction of the conveyance screw 33, and a third gear 43 that meshes with the first gear 41 and the second gear 42 to impart a drive power to the both gears 41 and 42. Each gear 41 to 43 is configured by a resin material, for example.

Figure 7:
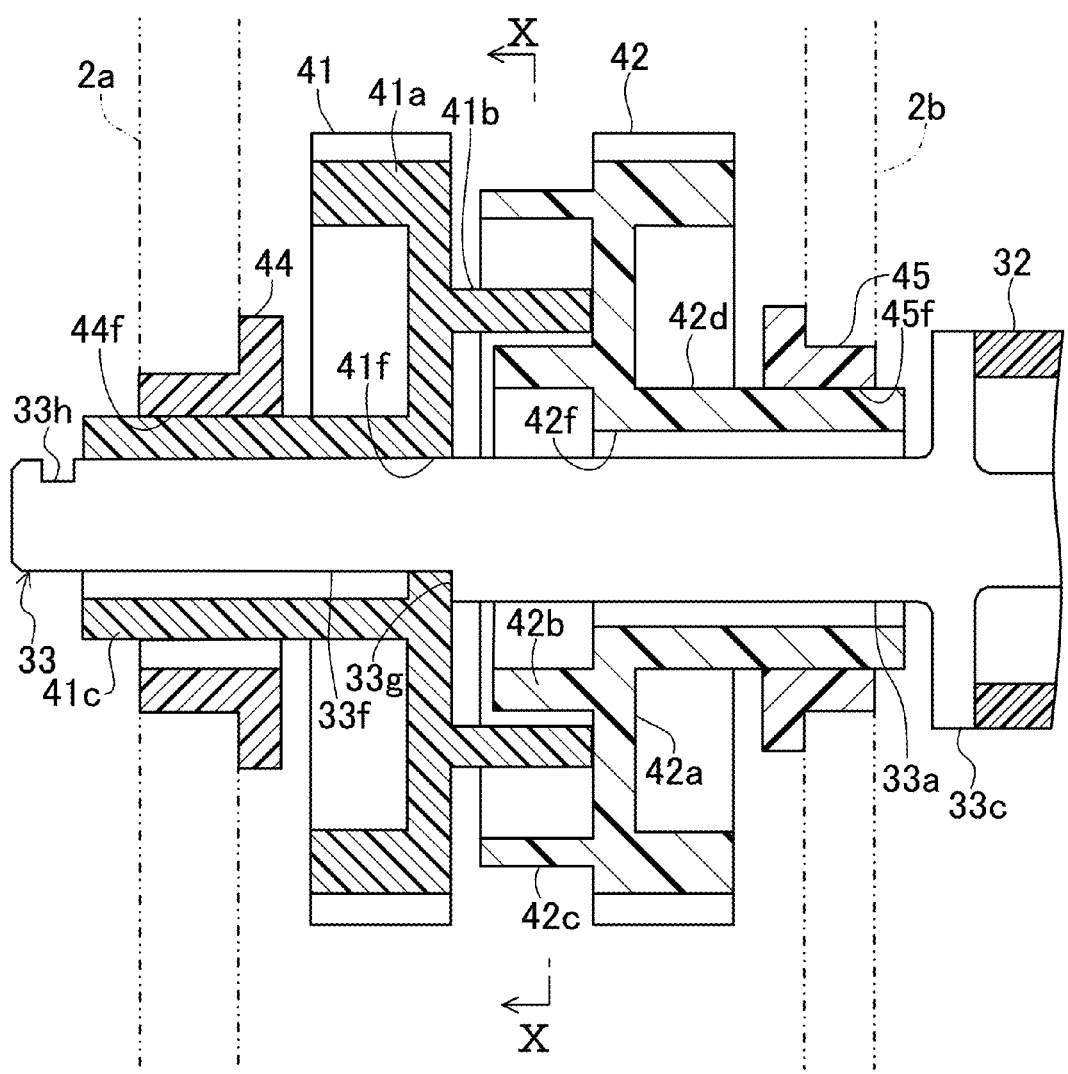
FIG. 7 is a cross-sectional view along line VII-VII of FIG. 5.
Figure 8:
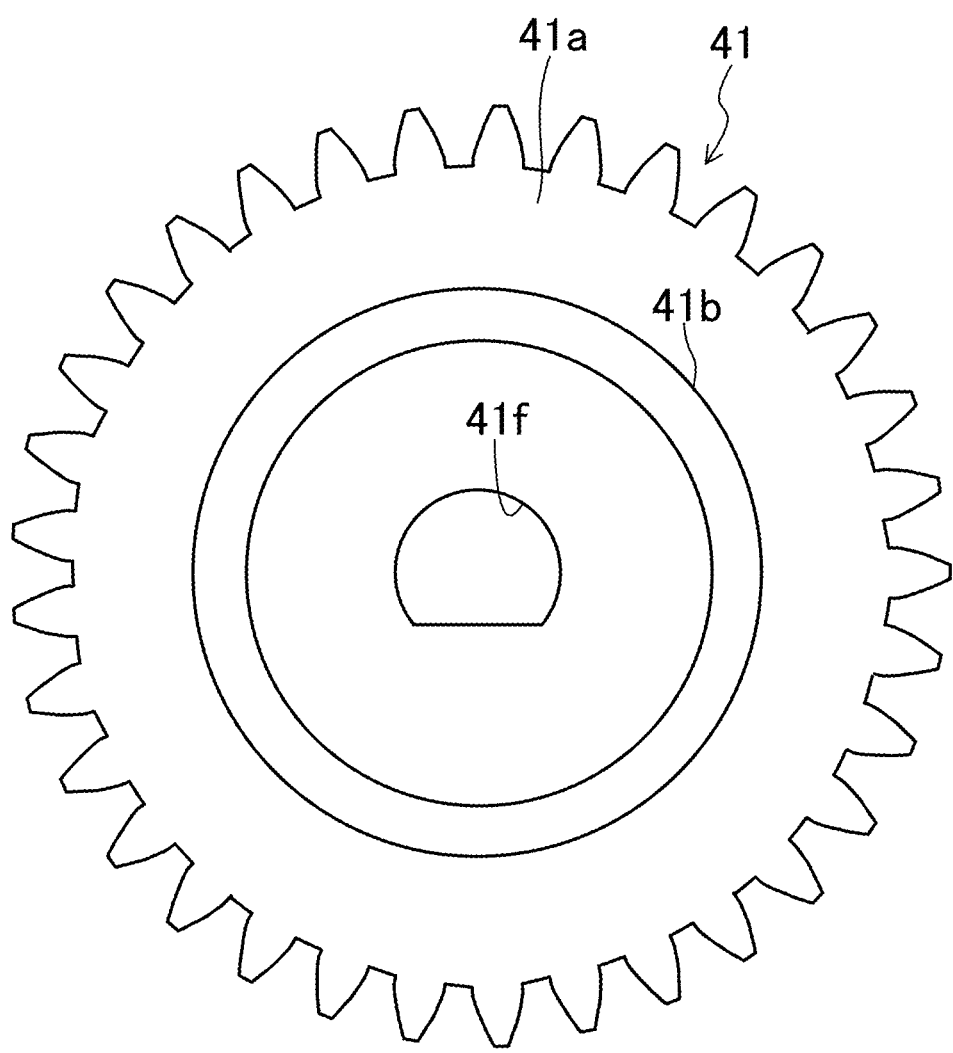
FIG. 8 is a plain view, as seen from a first cam unit side, which shows a first gear.

As shown in FIG. 7 and FIG. 8, the first gear 41 includes a first gear body unit 41a, of substantially circular plate shape, where gear teeth are formed along the outer circumferential portion, a first cam unit 41b protruded from a surface at the second gear 42 side in the first gear body unit 41a, and a tubular axis unit 41c protruded from the opposite surface of the second gear 42 side in the first gear body unit 41a.

At a center portion of the first gear body unit 41a, a fitting hole 41f of substantially D-lettered shape is formed. Into the fitting hole 41f, a D cut unit 33f formed at one end side of the axial unit 33a of the conveyance screw 33 is fitted. As a result, the conveyance screw 33 is rotated together with the first gear body unit 41a (first gear 41). A surface at the second gear side of the first gear body unit 41a abuts a vertical surface 33g generated by the formation of the D cut unit 33f in the axial unit 33a. The first gear body unit 41a is locked to the axial unit 33a by a snap ring (not shown) fit into a ring groove 33h of the axial unit 33a.

The first cam unit 41b is formed in a cylindrical shape that is coaxial with the first gear body unit 41a. An inner circumferential surface of the first cam unit 41b functions as a cam surface that abuts (linearly contacts) an outer circumferential surface of the second cam unit 42b of the second gear 42.

The tubular axis unit 41c of the first gear 41 is supported rotationally by a first bearing (a first support member) 44 to enable vertical movement (movement in one radial direction the first gear). The first bearing 44 includes a longhole-shaped bearing hole 44f extending vertically (see FIG. 6 and FIG. 7), and the tubular axis unit 41c is fitted to enable sliding vertically relative to the bearing hole 44f. The first bearing 44 is fixed to a fixing bracket 2a attached to the printer body 2.

Figure 9:
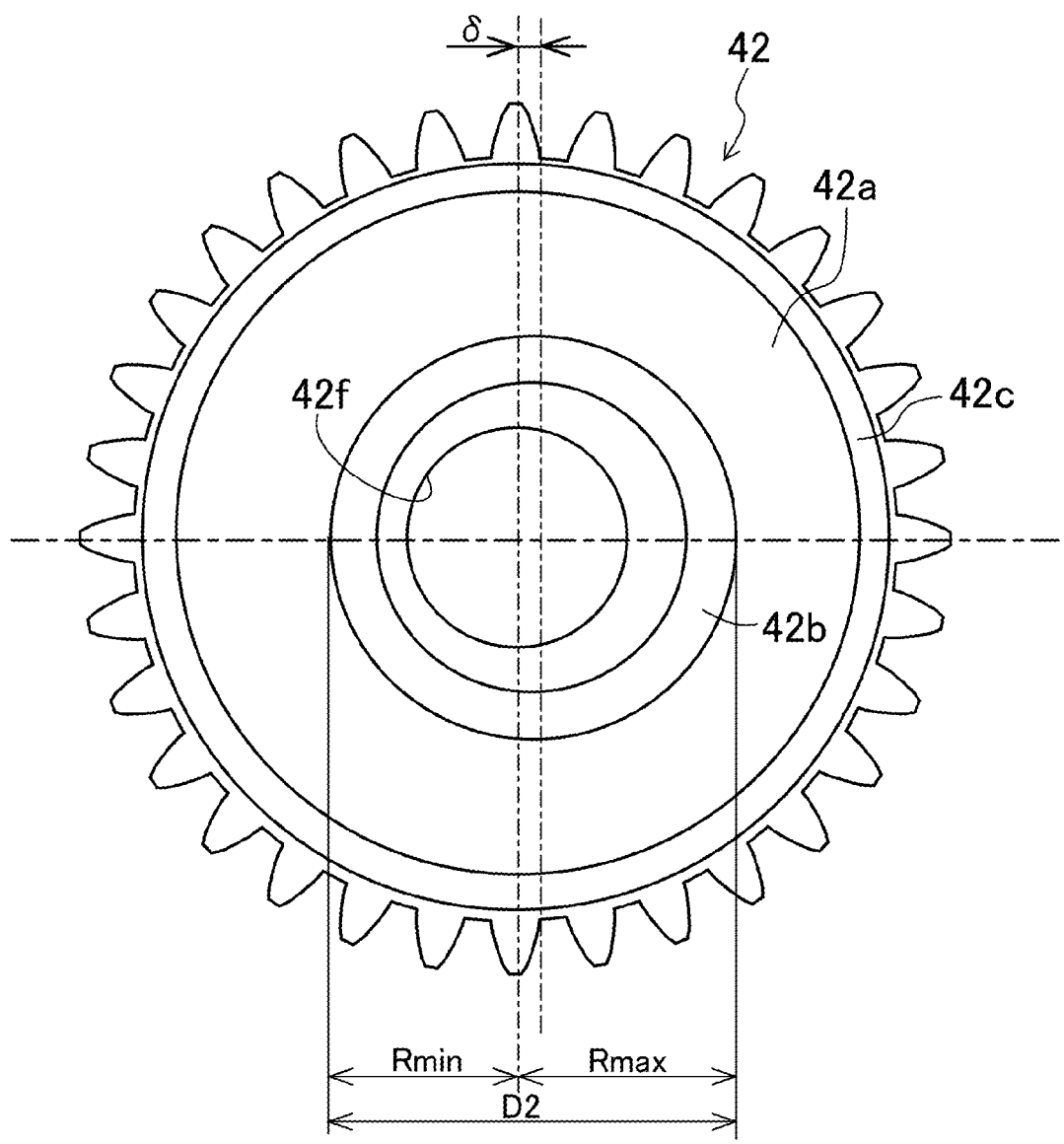
FIG. 9 is a plain view, as seen from a second cam unit side, which shows a second gear.

As shown in FIG. 7 and FIG. 9, the second gear 42 includes a second gear body unit 42a, of substantially circular plate shape, where gear teeth are formed along the outer circumferential portion, a second cam unit 42b and a tubular frame unit 42c protruded from a surface at the first gear 41 side in the second gear body unit 42a and a tubular axis unit 42d protruded from the opposite surface of the first gear 41 side in the second gear body unit 42a.

The second cam unit 42b is formed in a cylindrical shape that is eccentric to the axial center of the second gear body unit 42a. An outer circumferential surface of the second cam unit 42b functions as a cam surface that abuts (linearly contacts) an inner circumferential surface of a tubular cam unit 41a of the first gear 41. δ in FIG. 9 indicates an amount of eccentricity of the second cam unit 42b. Here, a relationship of S=D1−D2=2×δ (see FIG. 10) is satisfied, where D2 denotes an outer diameter of the second cam unit 42b and D1 denotes an inner diameter of the first cam unit 41b. Further, a relationship of D1=2×Rmax is satisfied, where Rmax denotes a radius of a maximum radial portion of the second cam unit 42b and Rmin denotes a radius of a minimum radial portion thereof.

The tubular frame unit 42c of the second gear 42 is formed in a cylindrical shape that is coaxial with the second gear body unit 42a. The tubular frame unit 42c is disposed concentrically radially outward of the second cam unit 42b, when viewed from the axial-center direction of the second gear body unit 42a. Between the tubular frame unit 42c and the second cam unit 42b, the first cam unit 41b of the first gear 41 is positioned.

The tubular axis unit 42d of the second gear 42 is supported rotationally by a second bearing 45 (a second support member) so that the tubular axis unit 42d is not capable of making a radial movement. That is, the second bearing 45 has a cylindrical bearing hole 45f, and the outer circumferential surface of the tubular axis unit 42d is fitted to the inner circumferential surface of the bearing hole 45f. The second bearing 45 is fixed to a fixing bracket 2b attached to the printer body 2. A hollow hole 42f of the tubular axis unit 42d penetrates through the second gear body unit 42a. Through the hollow hole 42f, the axial unit 33a of the conveyance screw 33 penetrates. The inner diameter of the hollow hole 42f is set sufficiently large so as not to interfere with the inner wall surface of the tubular axis unit 42d when the conveyance screw 33 is displaced downward as described below.

The third gear 43 is linked to a motor (not shown) attached to the printer body 2. The third gear 43 is supported rotationally by a shaft (not shown) fixed to the printer body 2. Then, the drive power of the motor is transmitted via the third gear 43 to the first gear 41 and the second gear 42.

Figure 10:
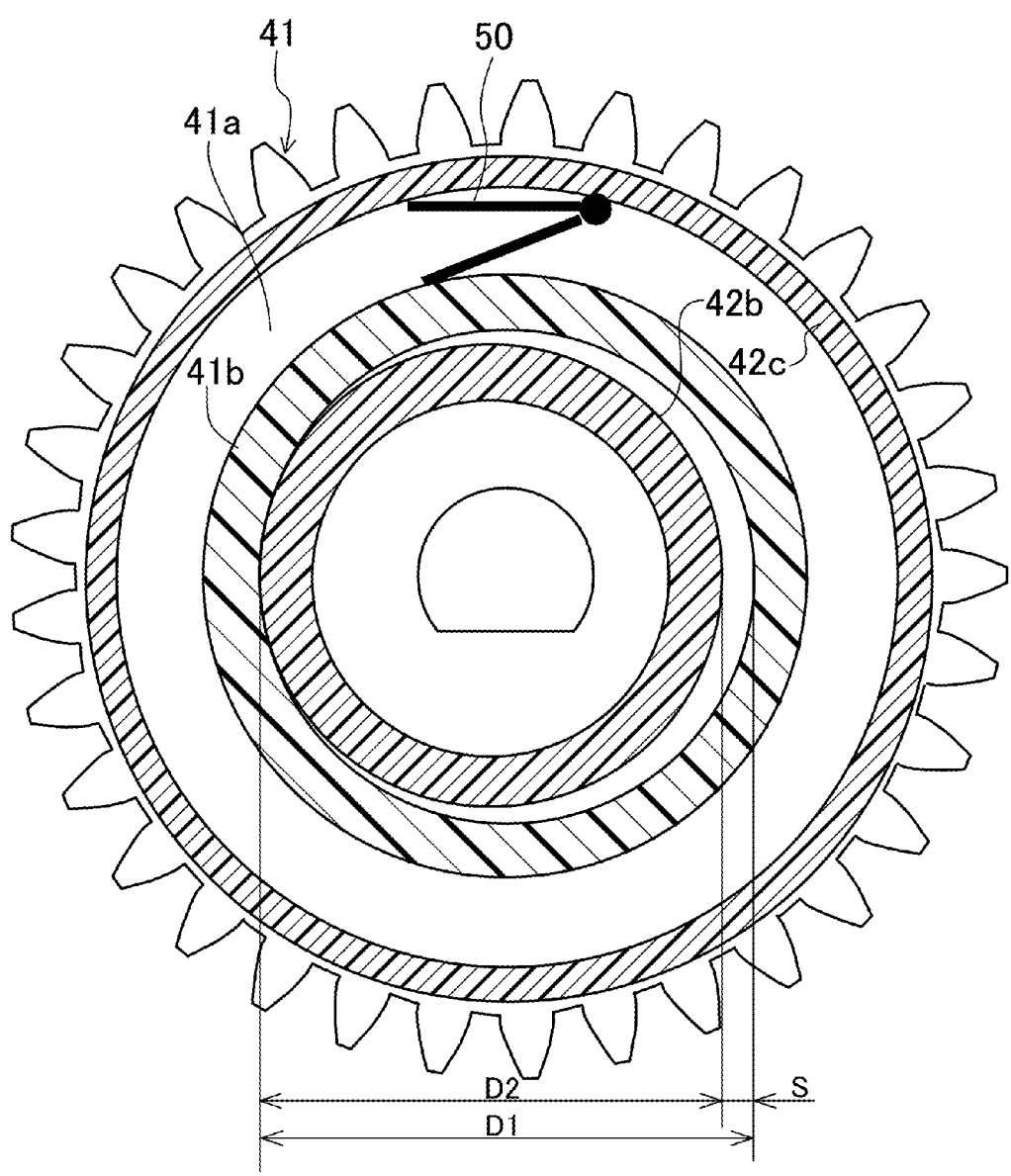
FIG. 10 is a cross-sectional view along line X-X of FIG. 7.

As shown in FIG. 10, between the tubular frame unit 42c of the second gear and the first cam unit 41b of the first gear 41, an energizing spring 50 is arranged. The energizing spring 50 is configured to energize in a direction in which the first cam unit 41b is pressed against the second cam unit 42b. Specifically, the energizing spring 50 is disposed to abut the upper end of the first cam unit 41b when a maximum radial part of the second cam unit 42b abuts the end of a horizontal one side (left side of FIG. 10) in the inner circumferential surface of the first cam unit 41b. In this state, the energizing spring 50 is configured to energize the first cam unit 41b downward.

The number of teeth of the first gear 41 and that of the second gear 42 are different. In the present embodiment, the number of teeth of the first gear 41 is 33 and the number of teeth of the second gear 42 is 32. That is, the number of teeth of the first gear 41 is greater by one than the number of teeth of the second gear 42. The number of teeth of the third gear 43 is the same, that is, 33, as that of the first gear 41, for example.

Figure 11:
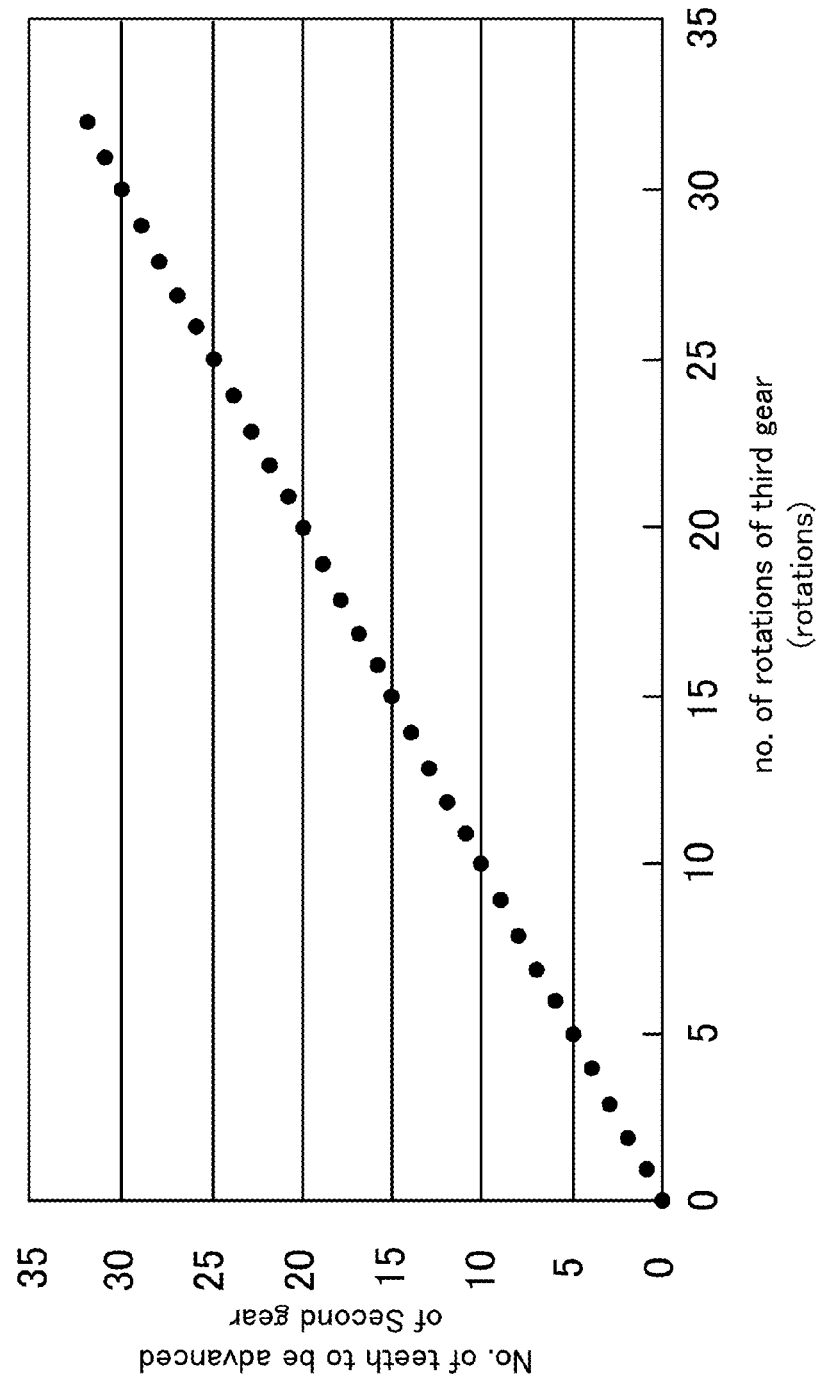
FIG. 11 is a graph showing a relationship between the number of rotations of a third gear and the number of teeth to be advanced of a second gear.

Thus, when the number of teeth of the first gear 41 is configured to be greater by one than the number of teeth of the second gear 42, there occurs a circumferential phase difference between the first gear 41 and the second gear 42 along with the rotation of the third gear 43. Specifically, each time the third gear 43 makes one rotation, the second gear 42 (number of teeth: 32) advances by one tooth in a circumferential direction relative to the first gear 41 (number of teeth: 33) (see FIG. 11). Therefore, when the third gear 43 makes 32 rotations, the second gear 42 advances by 32 teeth relative to the first gear 41, that is, by angle 2π in the circumferential direction.

The first cam unit 41b and the second cam unit 42b are configured to work together to convert, in a predetermined period, a circumferential relative displacement between the first gear 41 and the second gear 42 generated when the third gear 43 rotates, into a vertical displacement (displacement in one radial direction of the first gear 41) of the first gear 41.

Figure 12:
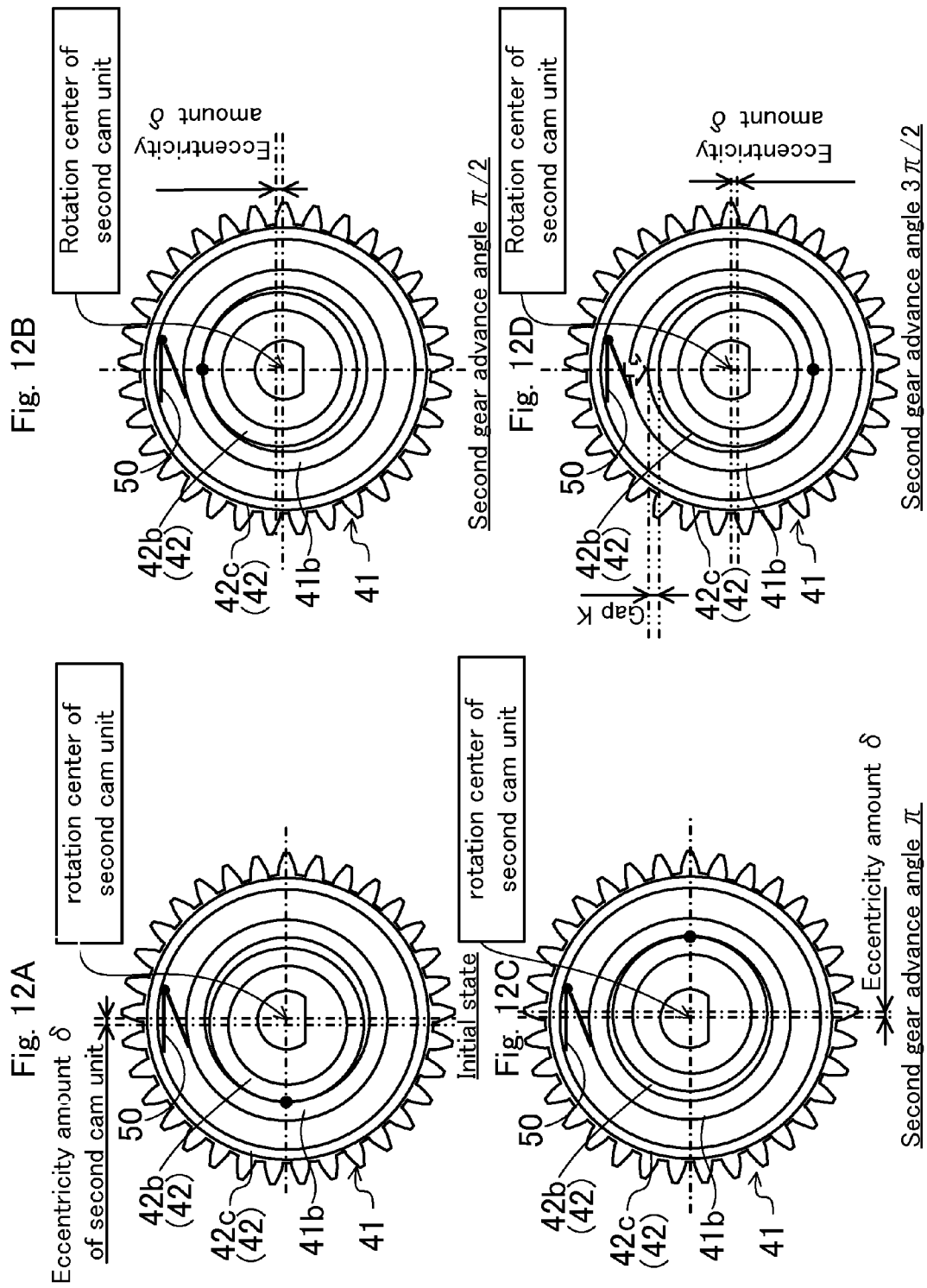
FIGS. 12A~12D are explanatory diagrams each describing a conversion logic for converting a circumferential relative displacement, generated along with rotation of a third gear, between a first gear and a second gear, into a vertical displacement of the first gear.

FIG. 12 are explanatory diagrams each describing the conversion logic. FIG. 12A shows an initial state, and FIGS. 12B, 12C, and 12D show states where advance angles (phase in a clockwise direction in the figures) of the second gear 42 relative to the first gear 41 are π/2(rad), π(rad), and 3π/2(rad) relative to the initial state.

When the advance angle of the second gear 42 is equal to or more than 0(rad) and equal to or less than π(rad), a maximum eccentric part (black circle part in the figure) of the second cam unit 42b abuts (linearly contacts) the inner circumferential surface of the first cam unit 41b, and therefore, the rotation axial center of the first gear 41 and the rotation axial center of the second gear 42 match (see FIG. 12A to FIG. 12C).

However, when the advance angle of the second gear 42 exceeds π(rad) and is less than 2π(rad), a part (part smaller in radius than the maximum eccentric part) other than the maximum eccentric part (black circle part in the figure) of the second cam unit 42b abuts (linearly contacts) the inner circumferential surface of the first cam unit 41b, and therefore, the rotation axial center of the first gear 41 and the rotation axial center of the second gear 42 do not match. That is, when the advance angle of the second gear 42 is 3π/2 (state in FIG. 12D), for example, the first cam unit 41b is displaced downward by the energizing force from the energizing spring 50 such that a minimum eccentric part of the second cam unit 42b abuts the inner circumferential surface of the first cam unit 41b (that is, such that no gap K is generated between the second cam unit 42b and the first cam unit 41b). Thus, a position of the rotation axial center of the first gear 41 is displaced downward.

Figure 13:
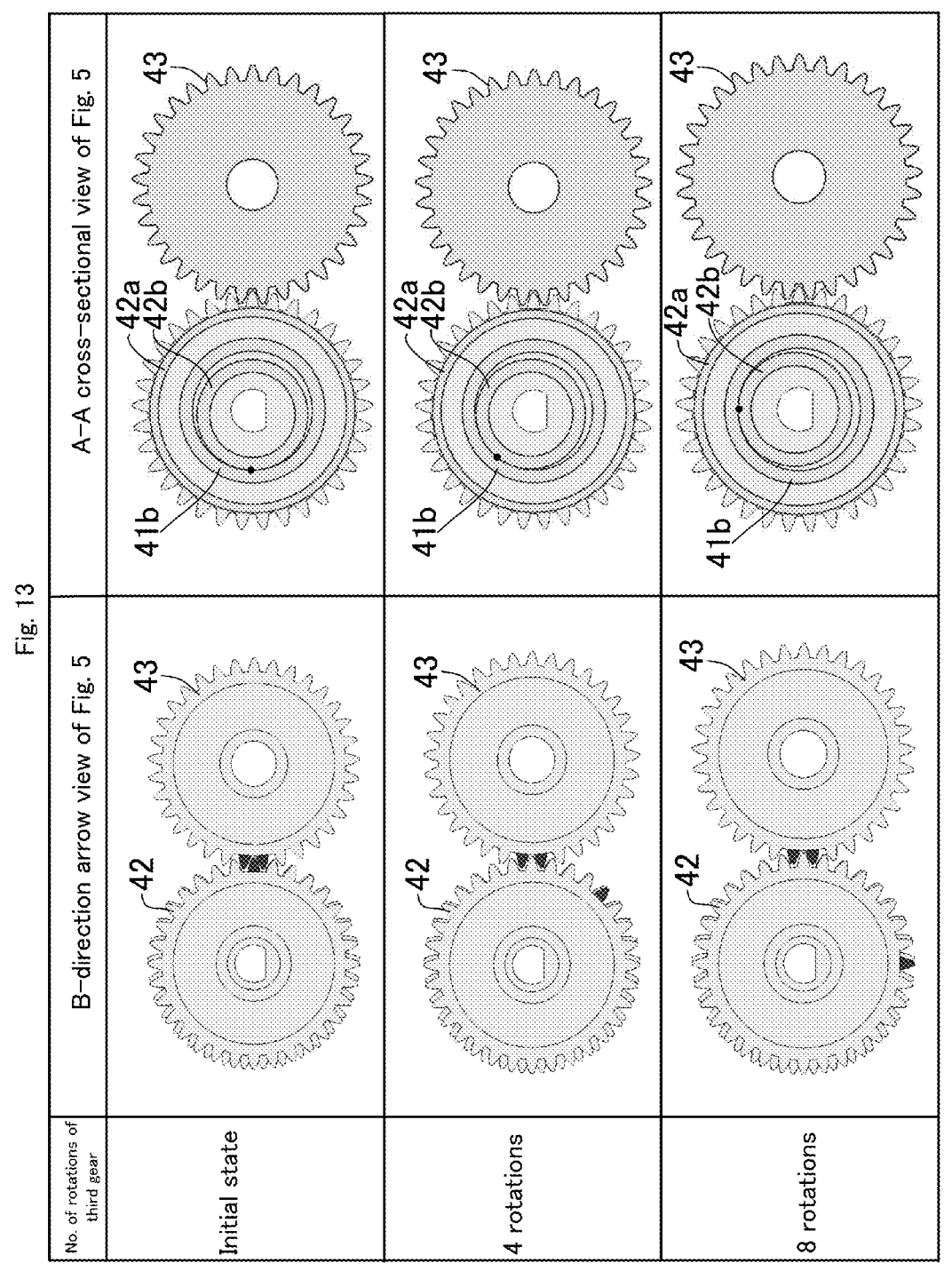
Figure 14:
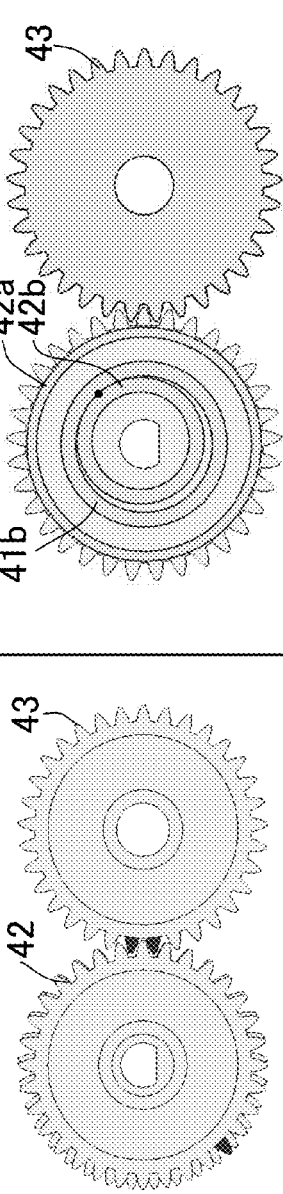
FIG. 14 is a table equivalent to FIG. 13, with cases where the numbers of rotations of a third gear are 12 rotations, 16 rotations, and 20 rotations.
Figure 15:
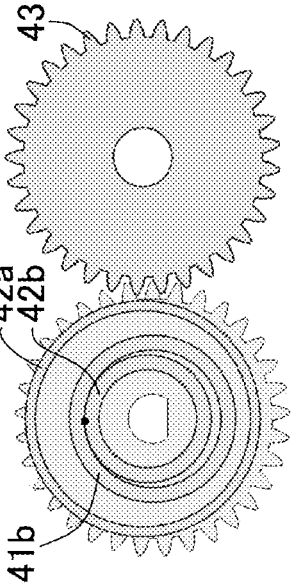
FIG. 15 is a table equivalent to FIG. 13, with cases where the numbers of rotations of a third gear are 24 rotations, 28 rotations, and 32 rotations.

FIG. 13 to FIG. 15 each show a change (left-side column of each figure) in a phase position of the teeth of the second gear 42 when the number of rotations of the third gear 43 increases by every four rotations up to 32 rotations and a change (right-side column of each figure) in a contact position of the both cam units 41b and 42b. The left-side column of each figure corresponds to a cross-sectional view along line A-A of FIG. 5, and the right-side column of each figure corresponds to an arrow view in a direction B in FIG. 5.

Figure 16:
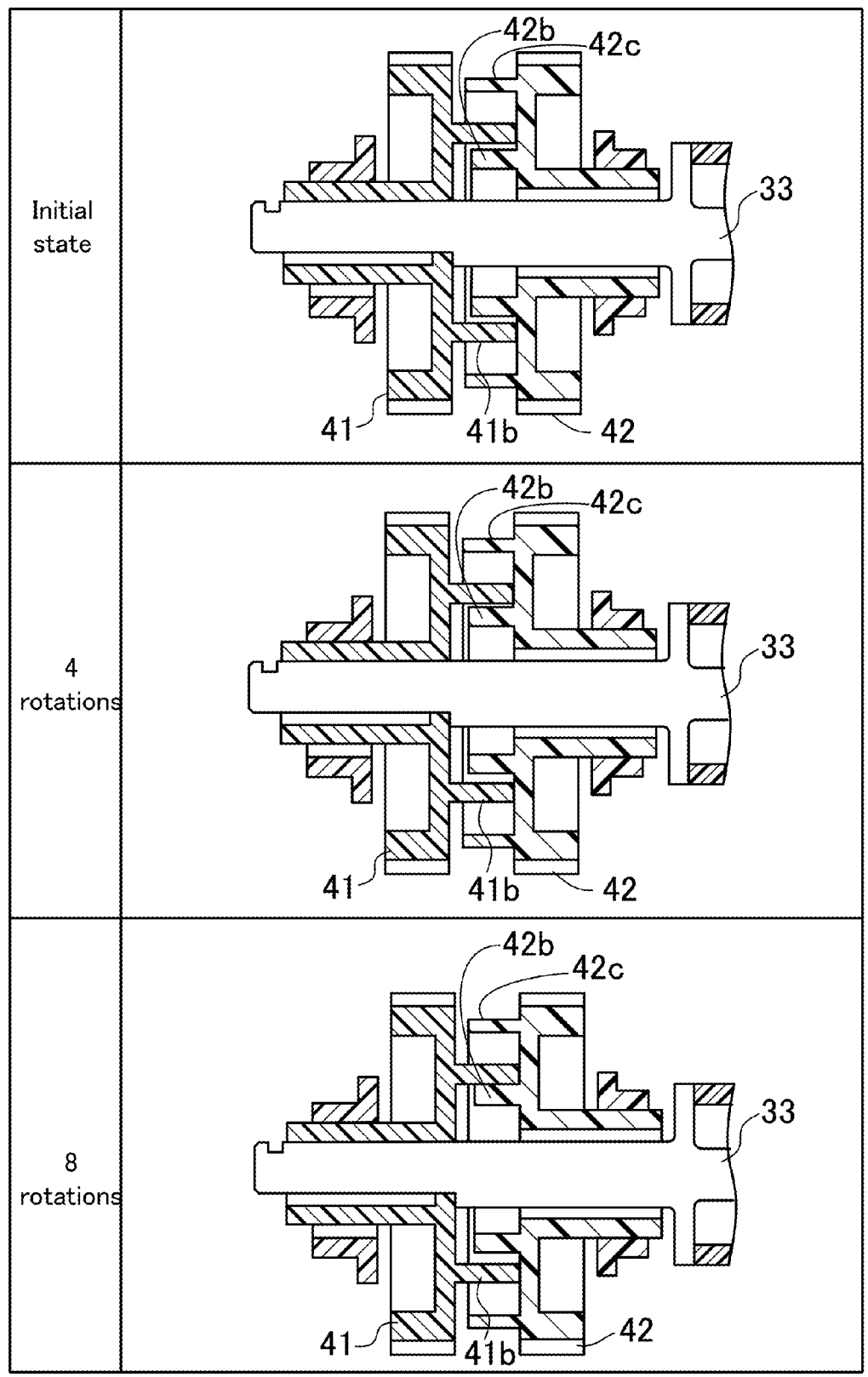
FIG. 16 is a table showing a change in top and bottom positions of the conveyance screw generated along with rotation of a third gear, with cases where the numbers of rotations of the third gear are 0 rotation (initial state), four rotations, and eight rotations.
Figure 17:
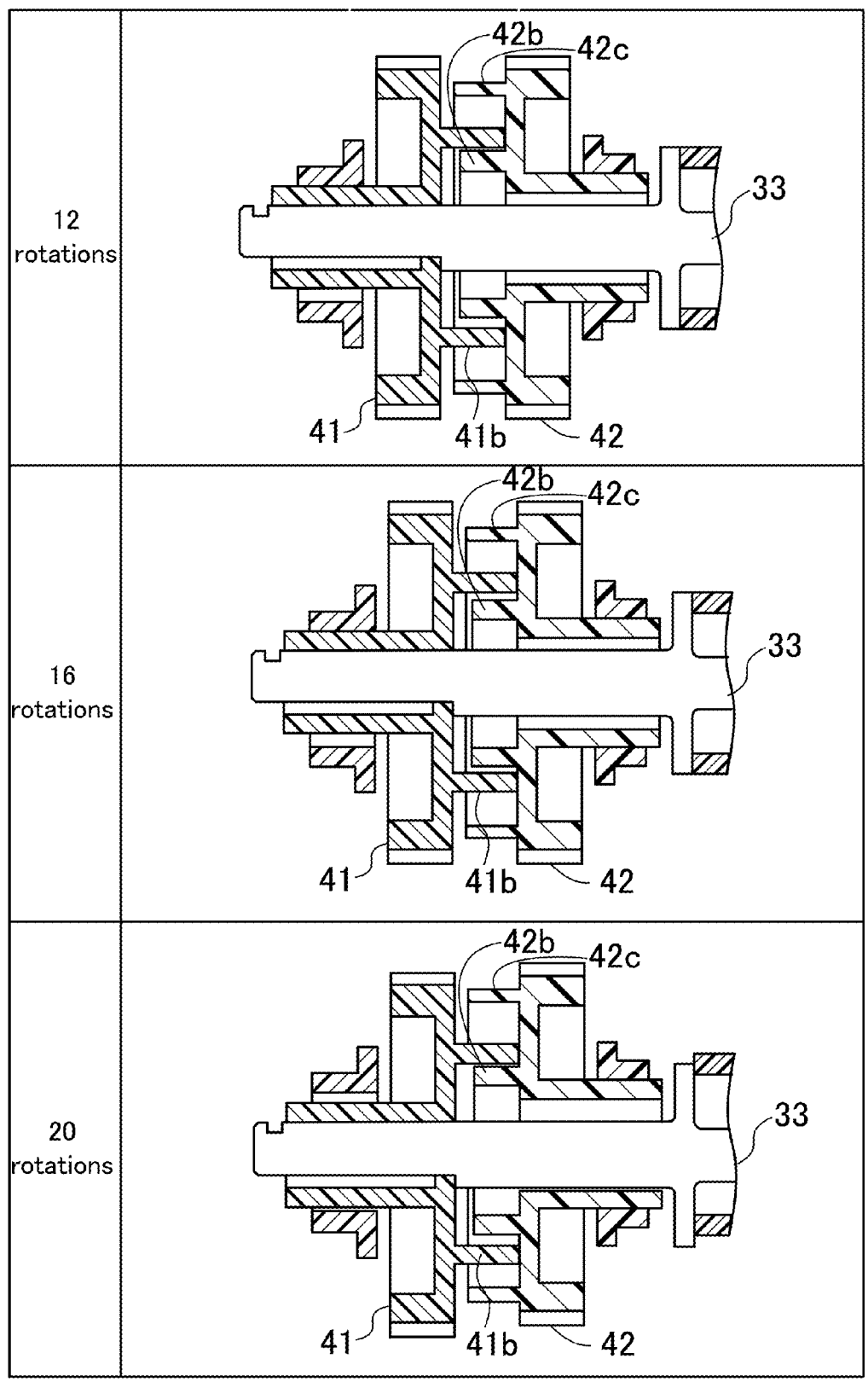
FIG. 17 is a table equivalent to FIG. 16, with cases where the numbers of rotations of a third gear are 12 rotations, 16 rotations, and 20 rotations.
Figure 18:
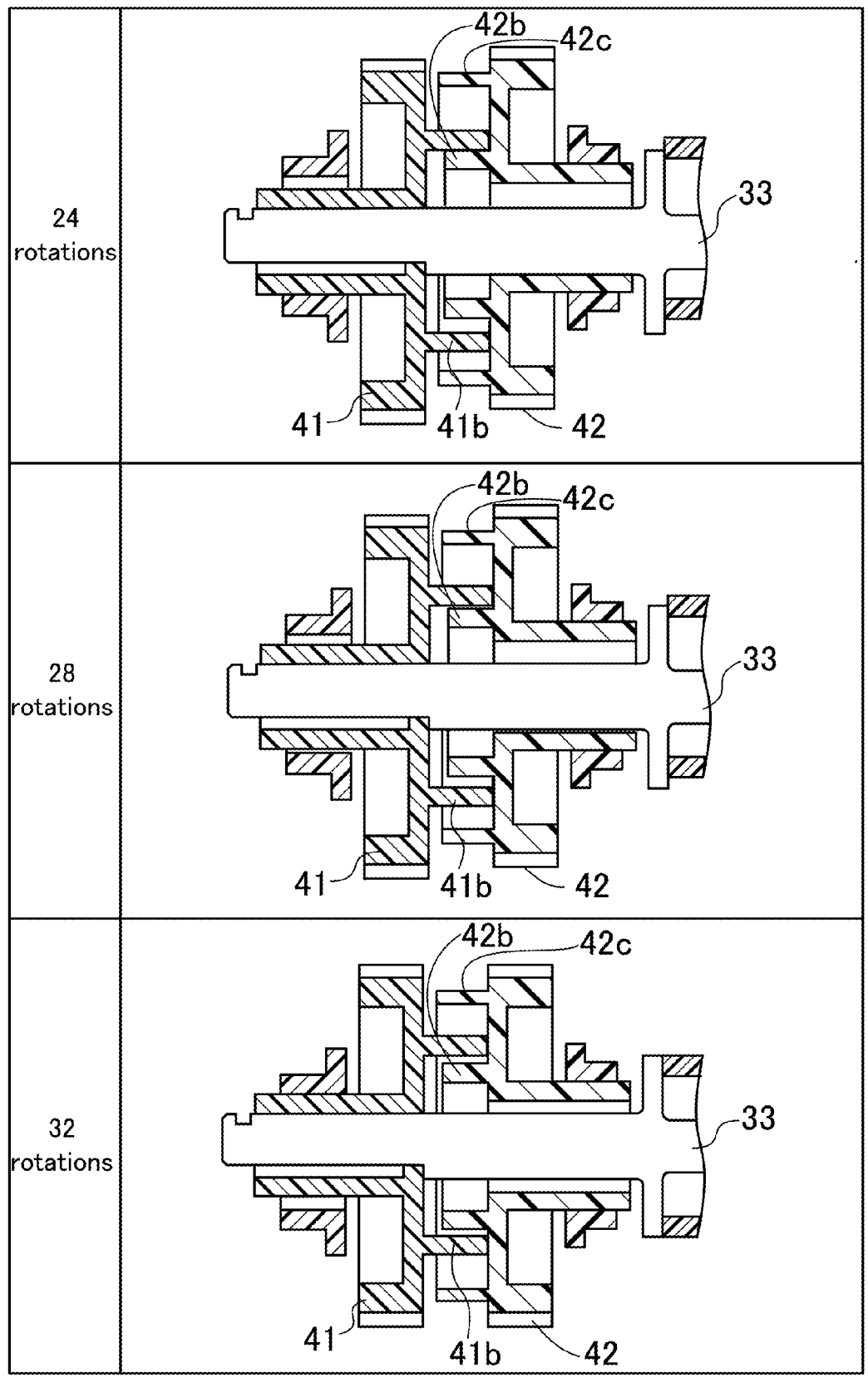
FIG. 18 is a table equivalent to FIG. 16, with cases where the numbers of rotations of a third gear are 24 rotations, 28 rotations, and 32 rotations.

As shown in FIG. 13 to FIG. 15, in the drive apparatus 40, in a period during which the third gear 43 makes 16 rotations from the initial state, the rotation axial centers of the first gear 41 and the second gear 42 match. After the third gear 43 makes 16 rotations, the axial center position of the first gear 41 is displaced downward relative to the axial center position of the second gear 42. Then, when the third gear 43 has made 24 rotations, the axial center position of the first gear 41 is the lowest. After the third gear 43 has made 24 rotations, the axial center position of the first gear 41 is displaced upward gradually, and when the third gear 43 has made 32 rotations, the axial center position of the first gear 41 is returned to its original position. The first gear 41 and the conveyance screw 33 are linked to make an integrated rotation together, and thus, when the first gear 41 is displaced downward, the conveyance screw 33 also is displaced downward. FIG. 16 to FIG. 18 each show a state where the conveyance screw 33 is moved upward and downward along with the displacement of the first gear 41.

Figure 19:
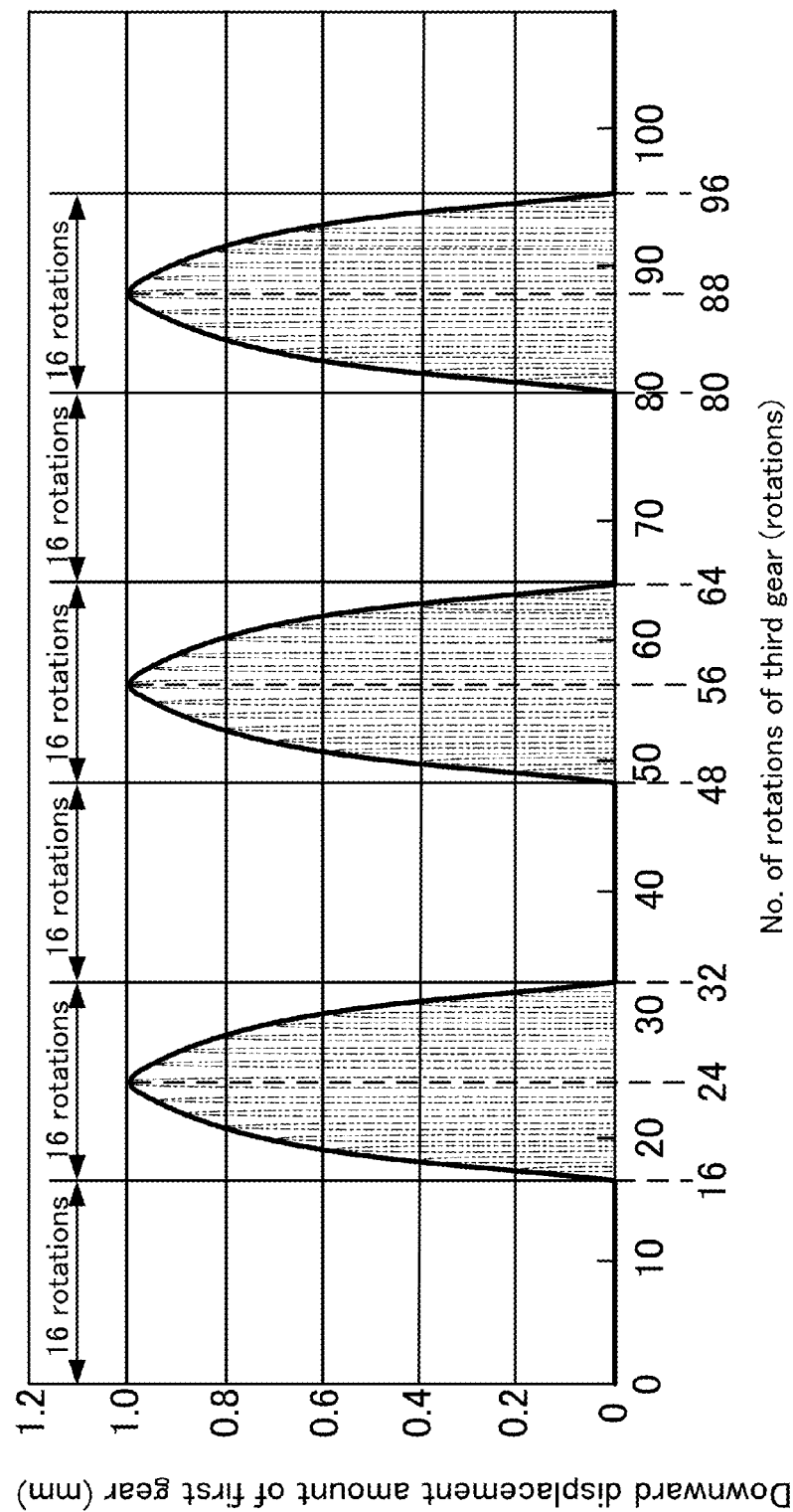
FIG. 19 is a graph showing a relationship between the number of rotations of a third gear and a downward displacement amount of a first gear.

FIG. 19 is a graph showing a relationship between the number of rotations of the third gear 43 and a downward displacement amount of the first gear 41. An actual line of the graph is a line obtained by plotting a downward displacement amount of the first gear 41 when the number of rotations of the third gear 43 is 1, 2, 3, . . . , that is, the integral number of rotations, and linking each plotted point (not shown) on a curve. The graph reveals that a state where the downward displacement amount of the first gear 41 is constant, that is, 0, and a state where the downward displacement amount of the first gear 41 exceeds 0 (state where the first gear 41 is displaced downward relative to the initial state) are repeated alternatingly when the third gear 43 makes 16 rotations. That is, it can be said that the downward displacement amount of the first gear 41 changes periodically in a predetermined period in accordance with the number of rotations of the third gear 43. Further, the graph also reveals that a movement profile of the first gear 41 during displacement is very smooth. It is noted that a two-dot chain line of the graph is a line schematically depicting a downward displacement amount of the first gear 41 between respective plots described above (not shown). The reason why no displacement profile is depicted below the horizontal axis of the graph (that is, in a region showing an upward displacement of the first gear 41) is because the upward displacement of the first gear 41 is restricted by the upper end of the bearing hole 44f (see FIG. 7).

Thus, in the present embodiment, the conveyance screw 33 is displaced downward periodically, and therefore, even when a clearance between the conveyance screw 33 and the inner wall surface of the conveyance case 32 is large, it is possible to convey a toner while ensuring that the toner remaining in the lower end within the conveyance case 32 is scratched by the conveyance screw 33. Further, when the clearance is large, it becomes possible to restrain the interference between the outer diameter part of the conveyance screw 33 and the inner wall surface of the conveyance case 32 so that noise is prevented from being generated.

<<Other Embodiments>>

In the above-described embodiment, the drive apparatus 40 is linked to the upstream end in a toner conveyance direction of the conveyance screw 33; however, this is not limiting, and the drive apparatus 40 may be linked to the downstream end in a toner conveyance direction of the conveyance screw 33, for example.

Further, in the above-described embodiment, the circumferential relative displacement, between the first gear 41 and the second gear 42, generated when the third gear 43 rotates, is converted, by the drive apparatus 40, into a vertical displacement (displacement in one radial direction of the first gear 41) of the first gear 41; however, this is not limiting and the circumferential relative displacement may be converted into a displacement in a horizontal direction of the first gear 41, for example.

Further, in the above-described embodiment, the first cam unit 41b is configured by the cylindrical cam unit and the second cam unit 42b is configured by the cylindrical eccentric cam unit; however, the cam shape of each cam unit is not limited thereto. That is, the cam shape may be any shape to enable conversion of a circumferential relative displacement, generated along with rotation of the third gear 43, between the first gear 41 and the second gear 42, into a displacement in one radial direction of the first gear 41.

Further, in the above-described embodiment, the energizing spring 50 is arranged between the tubular frame unit 42c and the first cam unit 41b; however, the energizing spring 50 may not necessarily be needed. That is, the first gear 41 may be displaced downward by its weight, without arranging the energizing spring 50.

Further, in the above-described embodiment, the toner case 32 is formed in a pipe-like shape; however, this is not limiting and the toner case 32 may be in a container-like shape of which the top opens, for example.

Further, in the above-described embodiment, the first gear 41 is different in number of teeth from the second gear 42 by one tooth; however, naturally, the difference may be two or more.

Further, in the above-described embodiment, the number of teeth of the third gear 43 is set equally to the number of teeth of the first gear 41, that is, 33 teeth; however, this is not limiting and the number of teeth may be 32 or less, and naturally, the number of teeth may be 34 or more.

Further, in the above-described embodiment, description proceeds with a case where an item to be conveyed by the conveyance screw 33 is toner; however, the item to be conveyed may be cement, etc., as well as toner.

As described above, the technology of the present disclosure is useful for a drive apparatus that drives an axial conveyance screw arranged in a case, and in particular, is useful when it is applied to a conveyance screw for toner conveyance used in an electrophotographic image forming apparatus.

What is claimed is:

1. A drive apparatus, comprising:
a first gear fixed to an axial conveyance screw arranged within a case;
a second gear arranged in tandem with the first gear in an axial-center direction of the conveyance screw;
a third gear that meshes with the first gear and the second gear to impart a drive power to the both gears;
a first support member that supports the first gear to enable movement in one radial direction; and
a second support member that supports the second gear to disable movement in a radial direction, wherein
the number of teeth of the first gear is different from the number of teeth of the second gear, a side surface at the second gear side in the first gear is formed with a first cam unit that protrudes toward the second gear, a side surface at the first gear side in the second gear is formed with a second cam unit that protrudes toward the first gear, and when the first cam unit and the second cam unit work together, a circumferential relative displacement, generated along with rotation of the third gear, between the first gear and the second gear is configured to be converted into a displacement in the one direction of the first gear, in a predetermined period in accordance with the number of rotations of the third gear.

2. The drive apparatus according to claim 1, wherein
the first cam unit is a cylindrical cam unit formed coaxially with a rotation axis of the first gear, and
the second cam unit is an eccentric cam unit that remains eccentrically relative to the rotation axis of the second gear and linearly contacts an inner circumferential surface of the cylindrical cam unit.

3. The drive apparatus according to claim 2, further comprising:
an energizing member that energizes so as to press the first cam unit against the second cam unit.

4. The drive apparatus according to claim 1, wherein
the conveyance screw is a conveyance screw for conveying a toner used for an electrophotographic image forming apparatus.

* * * * *